Nov. 27, 1928.
D. DYRESEN
1,693,142
SEPARABLE FASTENER
Filed Dec. 20, 1924
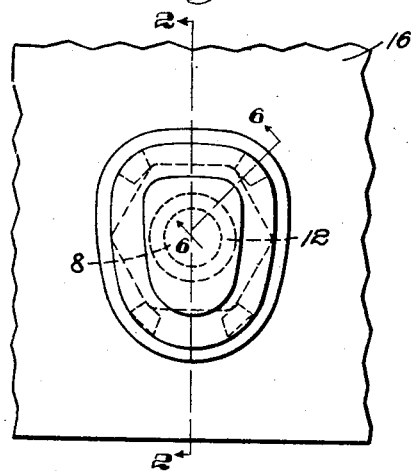
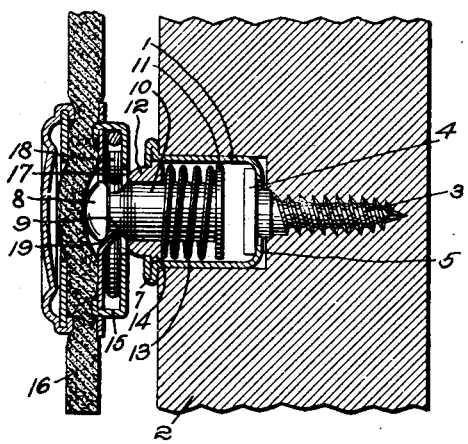
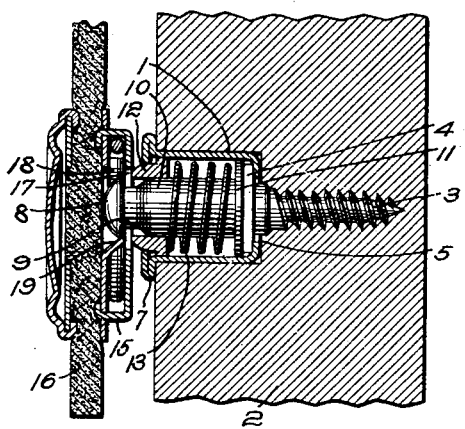
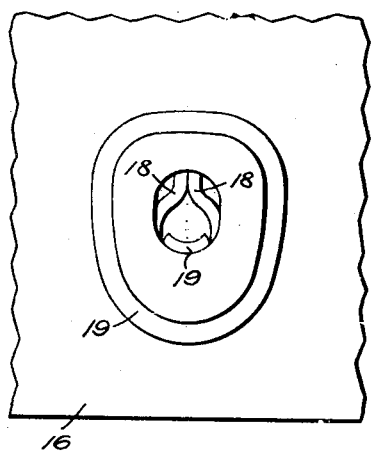
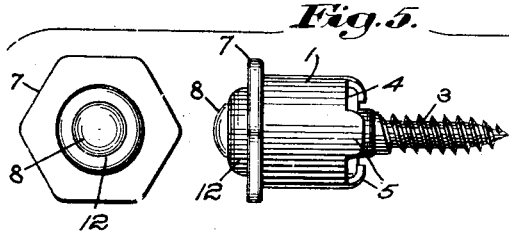
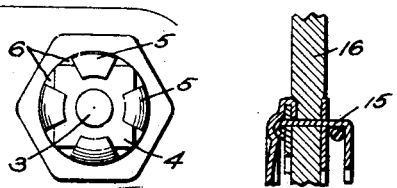
Inventor:
Didrick Dyresen,
by Emery Booth Janney & Varney
Attys.

Patented Nov. 27, 1928.

1,693,142

UNITED STATES PATENT OFFICE.

DIDRICK DYRESEN, OF MALDEN, MASSACHUSETTS.

SEPARABLE FASTENER.

Application filed December 20, 1924. Serial No 757,154.

This invention aims to provide an improved separable fastener.

In the drawings, which show one illustrative embodiment of my invention:—

Figure 1 is a front elevation of the fastener;

Fig. 2 is a section on the line 2—2 of Fig. 1, being partly in elevation;

Fig. 3 is a section similar to Fig. 2, but showing the position of the parts of the stud and socket as they are being engaged;

Fig. 4 is a rear elevation of the socket;

Fig. 5 includes a front, a side and rear elevation, respectively, of the stud; and Fig. 6 is a section on the line 6—6 of Fig. 1.

Referring to the drawings, I have shown a three-side lock fastener which includes a semi-flush type stud cooperating with a suitable socket of the three-side lock type. By the present invention, I am enabled to provide a stud which normally presents but very little of the socket-engaging part beyond the side of the body of the car and yet the stud is so constructed that engagement and disengagement of the socket with the stud is easily accomplished. Certainty of lock against varied strains arising from a number of causes is also provided for.

The preferred form of stud includes a casing 1 countersunk in a recess in a suitable support 2, which may be the body of an automobile, and held therein by a screw 3 having a head 4 secured to the inner end of the casing. The inner end of the casing presents a plurality of prongs 5, which are clinched over the head of the attaching screw to secure it to the casing. The head 4 of the screw is preferably rectangular and seats against the flat spots 6 between the prongs 5, thereby preventing relative rotation between the casing and screw.

At the front end of the casing, I have provided an outwardly extending flange 7, which seats against the outer face of the support 2. This flange presents a hexagonal periphery so that a suitable tool may be engaged therewith to rotate the casing and secure it to the support. The stud also includes a socket-engaging part having a head 8, a neck 9, a shank portion 10 and a base flange 11. The shank and base are normally within the casing and the head and neck extend beyond the flange 7 of the casing for engagement with a socket. I have also provided a sleeve 12, which fits over the socket-engaging part and normally projects beyond the flange 7 of the casing so as to cover the neck of the socket-engaging part, as best illustrated in Fig. 5. A spring 13 is interposed between the sleeve 12 and the base flange 11 of the socket-engaging part to maintain both parts in their normal relation with the casing. The sleeve 12 is provided with a shoulder 14, which seats against the flange 7, thereby limiting the forward movement of the sleeve.

The cooperating socket, which I have selected for illustrative purposes, comprises a casing 15 secured to a curtain fabric 16 in any suitable manner. This casing presents an elongated stud-receiving aperture 17 intersected by a plurality of spring jaws 18 formed from a spring enclosed in the casing 15. I have also shown a rigid jaw member 19, which also intersects the stud-receiving aperture 17 as illustrated in Figs. 2, 3 and 4. The socket illustrated is of the three-side lock type and is substantially as shown and described in the co-pending allowed application of Fred S. Carr, Serial No. 601,830, filed November 18th, 1922.

When securing the stud and socket together, the socket is first pressed toward the stud member so that the head 8 of the socket-engaging member enters the aperture 17 in the casing 15, as illustrated in Fig. 3. Further pressure applied to the socket urges the casing into engagement with the sleeve 12 and moves it into the casing against the pressure of the spring 13. Then the socket shifts to permit the head of the socket-engaging part to pass between the jaws 18 and 19. The rigid jaw 19 then enters the neck 9 of the socket-engaging part and the resilient jaws 18 exert a squeezing action upon the neck of the stud to urge the same toward the fixed jaw 19, as best illustrated in Fig. 2. Thus the socket is secured to the stud and is locked therewith against separation by a resolution of forces caused by an upward strain on the socket or an outward strain exerted upon three sides thereof. During engagement of the stud and socket, the sleeve 12 is resiliently pressed against the casing 15 of the socket.

Any strain in an outward direction at the top and sides of the socket cannot separate the socket from the stud because the jaws are firmly seated in the neck of the stud and further because the tipping movement is prevented to a large extent because of the fixed jaw 19 entered in the neck 9.

Separation of the socket is effected by grasping the lower edge of the curtain 16 and exerting a slight outward pull thereon to tip the socket relative to the stud. This outward pull on the curtain exerts a pull on the socket-engaging member which moves it out of the stud casing enough to permit the socket to tip relative thereto, thereby causing the fixed jaw 19 to ride down the shoulder between the head 8 and neck 9. During this tipping movement, the spring jaws 18 are spread apart by the tendency of the socket to move downwardly, thereby permitting the head 8 of the socket-engaging part to pass between the jaws.

Tipping movement is also permitted by a pull at the bottom of the socket, because the elongated part of the aperture 17 in the casing 15 extends in the direction away from the fixed jaw 19 (Fig. 4) and permits tipping of the casing without interference with the shank portion 10 of the socket-engaging part.

While I have shown and described a preferred embodiment of my invention, it will be understood that changes involving omission, substitution, alteration and reversal of parts, and even changes in the mode of operation, may be made without departing from the scope of my invention, which is best defined in the following claims.

I claim:

1. A three-side lock fastener installation comprising, in combination, a stud unit including a casing countersunk into a rigid support, a socket-engaging stud part assembled in axially shiftable relation with said casing and having a head and a neck adapted to be exposed beyond one end of said casing and spring means assembled as a part of the stud unit and normally pressing said socket-engaging part inwardly relative to said casing, a cooperating socket having jaw means intersecting a stud-receiving aperture for engagement with said neck and three-side locking means also provided by said socket adjacent to the said aperture for preventing separation of the socket from the stud except when a pull is exerted in a predetermined direction.

2. A separable fastener comprising, in combination, a stud member including a casing part secured to a support, a socket-engaging part assembled with said casing and presenting a head and a neck beyond said casing, an axially shiftable sleeve of larger diameter than said head assembled with the socket-engaging part for axial movement back of said head to conceal and expose said neck, resilient means forming part of the stud assembly normally pressing the sleeve into neck-concealing position and a cooperating socket having stud-engaging jaw means and also presenting means providing a stud-receiving aperture of sufficient size to admit the head of the stud while being smaller than the cross-sectional area of the axially shiftable sleeve of the stud, whereby when said socket is pressed toward said stud said means provided by said socket will engage the end of said sleeve to move it axially and uncover said neck to permit engagement of said jaws therewith.

3. A three-side lock fastener comprising, in combination, a semi-flush type stud including a casing secured to a rigid support, a socket-engaging part having a stud head extending slightly beyond said casing and a neck concealed by a spring-pressed sleeve assembled with said socket-engaging part, said sleeve being of larger diameter than the head of the stud, a cooperating socket including a casing presenting a stud-receiving aperture of smaller diameter than the diameter of said sleeve, thereby to exclude said sleeve from entering said aperture when the stud and socket are pressed into engagement with each other, a plurality of resilient neck-engaging jaws intersecting said aperture for engagement with the neck of the stud and cooperating means provided by the stud and socket for preventing separation of the stud and socket by an outward strain exerted upon the socket at three sides or by resolution of forces exerted thereon by an upward strain.

4. A three-side lock fastener comprising, in combination, a socket including a stud-receiving aperture and a plurality of neck-engaging jaws intersecting said aperture, a cooperating stud including a casing, an axially shiftable socket-engaging part presenting a head, a neck and a shank, an axially shiftable sleeve normally surrounding a portion of said socket-engaging part for concealing said neck and a spring assembled as a part of the stud unit and acting upon both the socket-engaging part and the sleeve, said socket being separable from said stud only by a pull at one side of the socket, thereby shifting said socket-engaging part relative to said sleeve against the pressure of the spring to permit the socket to tip out of engagement with the stud.

5. A semi-flush type fastener stud comprising a casing adapted to be countersunk into a support, a flange at the outer end of the casing adapted to seat against the support and a spring-pressed axially shiftable socket-engaging part substantially enclosed by said casing but normally presenting a socket-engaging head beyond the flanged end of said casing.

6. A semi-flush type fastener stud comprising a casing secured to a support and a spring-pressed socket-engaging stud part normally substantially enclosed by said casing, and a spring-pressed sleeve surrounding a portion of said socket-engaging part and shiftable relative to said casing and said socket-engaging stud part to permit engagement of a socket with said socket-engaging stud part.

7. A separable fastener stud comprising a casing, means for securing said casing to a support, an axially movable socket-engaging part located partially within said casing and presenting a socket-engaging head and neck beyond the outer end of said casing, an axially shiftable sleeve assembled with said socket-engaging part and normally concealing said neck to prevent accidental catching of articles on the head of the stud and spring means assembled as part of the stud unit and pressing said socket-engaging part and sleeve part relative to each other.

8. A separable fastener stud comprising a casing, means for securing said casing to a support, a socket-engaging part partially within said casing and presenting a socket-engaging head and neck beyond said casing, and a sleeve guided by said socket-engaging part and enclosing a portion thereof, said sleeve shiftable to permit engagement of a socket with the socket-engaging part and said socket-engaging part shiftable relative to said casing to permit disengagement of a socket therefrom and spring means cooperating between the socket-engaging part and the sleeve.

9. A flush type stud comprising a casing countersunk into a rigid suport and secured thereto by an attaching screw secured to the inner end of the casing, a flange at the outer end of said casing seated against the face of the support, a shiftable socket-engaging member having a shank portion surrounded by said casing, a head and neck extending beyond the flange of said casing, a shiftable sleeve normally embracing the neck and a portion of the shank, said sleeve limited in its movement in one direction by the flange portion of said casing and spring means cooperating between the socket-engaging part and the sleeve.

10. A flush type stud comprising a casing countersunk into a rigid support and secured thereto by an attaching screw secured to the inner end of the casing, a flange at the outer end of said casing seated against the face of the support, a shiftable socket-engaging member having a shank portion surrounded by said casing, a head and neck extending beyond the flange of said casing and a shiftable sleeve normally embracing the neck and a portion of the shank, said sleeve limited in its movement in one direction by the flange portion of said casing and a spring interposed between said sleeve and a flange on said socket-engaging portion to maintain both shiftable parts in their normal relation to said casing.

11. A separable fastener comprising, in combination, a semi-flush type stud having an axially movable socket-engaging part presenting a head and a neck, a tubular part surrounding a portion of said socket-engaging part, said socket-engaging and tubular parts each being movable relative to the other to cover and uncover said neck, resilient means forming part of the stud assembly and normally holding said stud and tubular parts in such relative positions that the tubular part normally conceals said neck and a cooperating socket having jaw means for engagement with said neck of said stud and means for engagement with one of said relatively movable parts of said stud for moving it relative to said other part to permit engagement of the jaw means with the neck of the stud.

12. A separable fastener installation including a semi-flush type stud secured to a rigid support, said stud including a casing having a body portion passing into an aperture in the support, a flange seated against the outer face of the support and an axially shiftable socket-engaging stud part having a head and a neck, the neck being normally concealed and a cooperating three-side lock fastener socket secured to a flexible carrying medium and having jaw means for engagement with the neck of the stud and said socket also having means formed as a part thereof for cooperating with the stud to expose the neck so that said jaws may be engaged therewith.

13. A fastener stud comprising a casing countersunk into a rigid support and a socket-engaging part shiftable axially in said casing to present beyond the outer end of said casing a head and a neck for cooperating with a suitable socket.

In testimony whereof, I have signed my name to this specification.

DIDRICK DYRESEN.